3,641,063
ANTIBIOTIC PURIFICATION PROCESS
Thomas W. Miller, Carteret, N.J., assignor to Merck & Co., Inc., Rahway, N.J.
No Drawing. Filed Jan. 22, 1968, Ser. No. 699,376
Int. Cl. C07f 9/38, 9/40
U.S. Cl. 260—348 R    2 Claims

ABSTRACT OF THE DISCLOSURE

Method for recovering Antibiotic 833A, chemically known as (—)(cis-1,2-epoxypropyl)phosphonic acid, from impure aqueous solutions containing said antibiotic, via adsorption on ion exchange resins with subsequent elution with water, aqueous salt solutions, or aqueous alcoholic salt solutions. Antibiotic 833A is active against both gram-positive and gram-negative bacteria.

CROSS REFERENCE TO RELATED APPLICATIONS

The subject matter of this application was disclosed but not claimed in the pending application of David Hendlin et al., Ser. No. 679,165, filed Oct. 30, 1967, now abandoned, and the continuation-in-part application thereof Ser. No. 728,059 filed May 9, 1968.

BACKGROUND OF THE INVENTION

Antibiotic 833A is a new and useful antibiotic formed by growing, under controlled conditions, a previously unknown strain of microorganism and is produced during the aerobic fermentation of suitable aqueous nutrient media. The fermentation broth and crude solutions of the antibiotic must be treated in order to obtain the antibiotic in purified form. Antibiotic 833A is a highly polar material, as indicated by the almost complete lack of adsorption from aqueous solutions by activated charcoal at a pH of 5. It is not adsorbed on acidic clays, and is not readily extracted, even in the presence of organic amines, by polar solvents, such as phenol. The present invention is directed to processes for recovering purified Antibiotic 833A by chromatographing the fermentation broth or crude solution of the antibiotic over an ion exchange resin.

SUMMARY

This invention relates to a method for recovering a novel antibiotic substance called Antibiotic 833A or, by its chemical name, (—)(cis-1,2-epoxypropyl)phosphonic acid, from aqueous solutions containing said antibiotic, by chromatographing the fermentation broth in which the antibiotic was produced or a solution of partially purified antibiotic over an anion or cation exchange resin with subsequent elution of the resin adsorbate with water or an aqueous or aqueous alcoholic salt solution. Antibiotic 833A is highly effective in inhibiting the growth of various gram-negative and gram-positive microorganisms.

DESCRIPTION OF THE PREFERRED EMBODIMENTS

Antibiotic 833A is a water-soluble, acidic substance which forms salts with inorganic and organic bases. By the present invention, it has been found that Antibiotic 833A can be purified by chromatographing the impure antibiotic in the form of the crude fermentation broth or in a partially purified state, such as in the form of its sodium or potassium salt, over an ion exchange resin and eluting the purified material with a suitable eluent such as aqueous or aqueous alcoholic solutions of sodium chloride, potassium chloride, ammonium chloride, tris-(hydroxymethyl)-aminomethane/HCl, and the like, and in some cases by elution with water. Both anion and cation exchange resins may be employed for this purification. Where an anion exchange resin is used, it is preferred to use a strongly basic resin although weakly basic resins can also be employed; where a cation exchange resin is employed, it is preferred to use a strongly acidic resin. Generally, a resin composed of quaternary ammonium exchange groups attached to a styrene-divinylbenzene polymer lattic (Dowex 1 x 2) on the chloride cycle is employed as the basic anion exchange resin, but resins composed of polyalkylamine groups attached to a styrene-divinylbenzene polymer lattice and crosslinked acrylic resins may also be employed; a resin of the sulfonate type having a styrene-divinylbenzene matrix (Dowex 50 x 2) on the hydrogen form is generally employed as the acidic cation exchange resin.

A preferred method for recovering purified antibiotic is to pass a solution of the antibiotic, such as a fermentation broth, the pH of which has been adjusted to pH 7 with aqueous base, such as sodium hydroxide or ammonium hydroxide, through a column containing an anion exchange resin of the quaternary ammonium type. Although the pH of the broth is generally adjusted to pH 7, the crude broth may be used directly without adjusting the pH. Generally the column is washed with water to remove any residual broth. The resulting resin adsorbate is then eluted with an alcoholic salt solution such as a 3% ammonium chloride solution in 90% methanol. The eluates are collected in fractions, the size of the fraction depending upon the size of the column employed. The bioactivity of the eluates is measured by assaying the eluate by means of a standard assay using *Proteus vulgaris* as the assay organism. The fractions containing most of the active material are then concentrated, generally in vacuo, to remove any organic solvent, and the concentrate is diluted with water. The activity of the concentrate is then determined by the standard assay procedure.

The Antibiotic 833A thus obtained may be further purified by passing the combined concentrated active fractions through a gel filtration resin such as a polyacrylamide gel. Generally, a gel of 50–100 mesh which will allow the fractionization, desalting, and concentration of substances with molecular weights from 200–2000, available under the trade name Bio-Gel P–2 from Bio Rad Laboratories, Richmond, Calif. is employed, although gels of 50–200 mesh may also be employed. The mesh is not a limiting factor, and the particular mesh employed will depend upon the size of the column to be used. The eluates are then collected in fractions, the fractions are assayed, and the most active fractions are combined.

Further purification of the antibiotic thus obtained may be achieved by concentrating the fractions obtained from the polyacrylamide gel and passing the concentrates through a column containing a strongly acidic cation exchange resin on the hydrogen form of the sulfonate type having a styrene-divinylbenzene matrix. The resulting resin adsorbate is then developed with water, and the eluate is collected in fractions. The pH of the most active fractions may then be adjusted separately to pH 7 with a base. Inorganic bases such as sodium hydroxide and potassium hydroxide and organic bases such as pyridine and triethylamine can be employed for the titration. After assay using the standard assay procedure, the most active fractions are combined to obtain an aqueous solution of Antibiotic 833A. Where the solid antibiotic is desired, the aqueous solution may be concentrated and freeze-dried. The dried antibiotic thus obtained may then be used to determine the pattern of sensitivity in the bacterial spectrum and cross-resistance assays as well as the in vivo efficacy of the antibiotic.

Alternatively, the salt obtained by the above procedure can be further purified by chromatography over a column of anion exchange resin composed of quaternary ammonium exchange groups attached to a styrene-divinylbenzene polymer lattice (Dowex 1 x 2) on the chloride cycle. The size of the column will depend upon the amount of material being chromatographed. Generally, for a sample of about 36 mg. a column 84 cm. x 1.5 cm. is sufficient. A resin having 50–100 mesh is generally used, but resins having 50–400 mesh may also be employed. When this purification procedure is followed, the resin is first washed with a dilute aqueous salt solution such as a sodium chloride, potassium chloride, ammonium chloride, or solutions of salts of organic bases, such as pyridine or tris-(hydroxymethyl)-aminomethane in order to equilibrate the resin. The salt of Antibiotic 833A is then dissolved in the dilute aqueous salt solution, and the solution is poured onto the resin. The column is then developed with the equilibrating solution and the eluate is collected in fractions. The fractions are then assayed to determine the general area of bioactivity, and the active fractions are combined and concentrated. The concentrate is then percolated over a gel filtration resin, such as a polyacrylamide gel (Bio-Gel P–2) to separate the antibiotic from the salt. The size of the column to be employed will depend upon the amount of material to be chromatographed. The fractions collected are assayed against *Proteus vulgaris* MB–838 to determine bioactivity. The active fractions are combined, concentrated, and freeze-dried.

In the above procedure, when a solution of tris-(hydroxymethyl)-aminomethane/HCl is employed in place of, for example, dilute sodium chloride solution to wash and equilibrate the resin, a tris-(hydroxymethyl)-aminomethane/HCl pH 8.0 (0.1 MCl−) buffer may be employed as the eluent. The salt of Antibiotic 833A, for example the sodium salt, is then dissolved in the buffer, and the solution is poured onto the column of the resin. The column is developed with the same buffer, and the eluent is collected in several fractions. The fractions are then assayed against *Proteus vulgaris* MB–838 to determine bioactivity and the active fractions are combined, concentrated, and dried. The dried residue is then dissolved in water, and the aqueous solution is percolated over a gel filtration resin, such as a polyacrylamide gel (Bio-Gel P–2), to separate the antibiotic from the buffer. The active fractions, as assayed against *Proteus vulgaris* MB–838, are combined and concentrated, and the concentrate is freeze-dried.

The tris-(hydroxymethyl)aminomethane salt of Antibiotic 833A thus obtained may be further purified by chromatography over a column of strongly acidic cation exchange resin composed of nuclear sulfonic acid exchange groups attached to a styrene-divinylbenzene polymer lattice (Dowex 50) on the sodium cycle to replace the tris-(hydroxymethyl)-aminomethane group with sodium. The solvent for the tris-(hydroxymethyl)-aminomethane salt is generally water, and the effluent which contains the sodium salt of Antibiotic 833A is assayed and freeze-dried to obtain the solid sodium salt. The above procedure may be used to obtain other salts of Antibiotic 833A, in addition to the sodium salt, by employing a cation exchange resin with the desired cation.

The Antibiotic 833A fermentation broths used as source material for the herein described fermentation process are produced in accordance with the procedure outlined in the pending application of David Hendlin et al., Ser. No. 679,165, filed Oct. 30, 1967, now abandoned, and have activities ranging from about 1–10 units per ml. when assayed on accordance with the standard assay procedure using *Proteus vulgaris* as the assay organism.

Antibiotic 833A is conveniently assayed by a discplate procedure using *Proteus vulgaris* MB–838 (ATCC 21100 and NRRL B–3361) as the test organism. The test culture is maintained as a slant culture on nutrient agar (Difco) plus 0.2% yeast extract (Difco). The inoculated slants are incubated at 37° C. for 18–24 hours and stored at refrigerator temperatures for one week, fresh slants being prepared each week.

The inoculum for the assay plates is prepared each day by inoculating a 250 ml. Erlenmeyer flask containing 50 ml. of nutrient broth (Difco) plus 0.2% yeast extract (Difco) with a scraping from the slant. The flask is incubated at 37° C. on a shaking machine for 18–24 hours. The broth culture is then adjusted to 40% transmittance at a wave length of 660 m$\mu$, using a Bausch & Lomb Spectronic 20 by the addition of 0.2% yeast extract solution to the growth. Uninoculated broth is used as a blank for this determination. 30 ml. of the adjusted broth is used to inoculate 1 liter of medium.

Nutrient agar (Difco) plus 0.2% yeast extract (Difco) is used as the assay medium. This medium is prepared, sterilized by autoclaving, and allowed to cool to 50° C. After the medium is inoculated, 10 ml. is added to sterile petri dishes and the medium is allowed to solidify.

The activity is expressed in terms of units, a unit being defined as the concentration of Antibiotic 833A per ml. which on a ½ inch paper disc will produce a zone diameter of 28 mm. Four concentrations of 833A are employed for the preparation of the standard curve, namely, 0.3, 0.4, 0.6 and 0.8 units per ml.; each concentration being obtained by the dilution in tris-(hydroxymethyl)-aminomethane buffer adjusted to pH 8.0. Four discs are placed on each of the five plates for the preparation of the standard curve, each plate containing one disc of each of the four concentrations of antibiotic shown above. The plates are incubated for 18 hours at 37° C. and the diameters of the zones of inhibition in millimeters are measured. An average zone diameter for each concentration is calculated, from which a standard curve is prepared on semi-log graph paper. The slope of the line obtained is between 4 and 5.

Samples of Antibiotic 833A to be assayed are diluted in 0.05 M buffer at pH 8.0 to an appropriate concentration. Discs are dipped into the test solution and placed on the surface of the assay plate; two discs for each sample are normally placed on one plate opposite to one another. Two discs dipped into 0.4 units per ml. of Antibiotic 833A solution are placed on the plate in an alternate position to the sample. The plates are incubated at 37° C. for 18 hours and the zone diameters in millimeters are determined. The potency of the sample is determined by means of a nomograph or from the standard curve.

Where the modified assay procedure using *Proteus vulgaris* as the assay organism is employed, 5 ml. of inoculated medium is used in the petri dish, and the antibiotic to be assayed is placed on a ½ inch paper disc. The dish with the test discs is then incubated for 18 hours at 37° C., and the zones of inhibition are measured. The potency is expressed as a quantity of solid per ml. producing a 25 mm. zone of inhibition under these conditions.

Antibiotic 833A is produced during the aerobic fermentation of suitable aqueous nutrient mediums, under controlled conditions by Antibiotic 833A-producing strains of *S. fradiae*. Aqueous mediums, such as those employed for the production of other antibiotics, are suitable for producing Antibiotic 833A. Such mediums contain sources of carbon and nitrogen assimilable by the microorganism and inorganic salts. In addition, the fermentation mediums contain traces of metals necessary for the growth of the microorganism which are commonly supplied as impurities incidental to the addition of other constituents of the medium. The exact quantity of the carbohydrate source or sources utilized in the medium will depend in part upon the other ingredients of the medium, but it is usually found that an amount of carbohydrate between about 1% and 6% by weight of the medium is satisfactory. These carbon sources may be used individually or several such carbon sources may be combined in the medium. Satisfactory nitrogen sources include myriad proteinaceous materials such as various forms of hydrolysates of casein, soybean meal, corn steep liquor, distilled solubles, yeast hydrolysates, tomato paste, and the like. The various sources of nitrogen, either alone or in combination, are used in amounts ranging from about 0.2–6% by weight of the aqueous medium.

The fermentation using the Antibiotic 833A-producing microorganisms can be carried out at temperatures ranging from about 25°–31° C. For optimum results, it is most convenient to conduct these fermentations at temperatures between 26°–30° C. The pH of the nutrient mediums suitable for growing *Streptomyces fradiae* and producing Antibiotic 833A can vary from about 5.5–7.5.

Antibiotic 833A and its salts are useful antimicrobial agents which are active in inhibiting the growth of both gram-positive and gram-negative pathogenic bacteria. The antibiotic can be used as an antiseptic agent to remove susceptible microorganisms from pharmaceutical, dental, and medical equipment. In addition, it is useful in separating certain microorganisms from mixtures of microorganisms. The antibiotic can be used to treat laboratory mice infected with various gram-negative organisms, and thereby remove sources of infection which would otherwise make the animals unsuitable for laboratory test purposes. Since the antibiotic and its salts are very active in inhibiting the growth of various species of Salmonella, it can be used as a disinfectant in washing eggs and areas subject to infection by Salmonella.

The following examples illustrate methods for producing and recovering Antibiotic 833A.

EXAMPLE 1

100 gallons of filtered broth was adjusted to pH 7 and passed through a column containing a strongly basic anion exchange resin of the quaternary ammonium type having a styrene-divinylbenzene matrix (Dowex 1 x 2). The resulting resin adsorbate was eluted with a 3% solution of ammonium chloride in 90% methanol and the eluate collected in 2-gallon fractions. Fractions 4, 5, and 6, which contained most of the Antibiotic 833A, had the following analysis:

| Fraction Number | Total solids, mg./ml. | Assay, units/ml. | Potency, units/mg. |
|---|---|---|---|
| 4 | 15.1 | 14 | .93 |
| 5 | 21.7 | 14 | .65 |
| 6 | 36.2 | 4 | .11 |

Fractions 4 and 5 were concentrated separately under reduced pressure to remove methanol to a concentration of about 200 mg./ml. of total solids. 275 ml. of the concentrate of fraction 5 containing a total of about 51 grams of solids was passed through 8.9 liters of spherical polyacrylamide gel of 50–100 mesh allowing the fractionation, desalting, and concentration of substances with molecular weights from 200–2000 (available under the trade name Bio-Gel P-2 from Bio-Rad Laboratories, Richmond, Calif.). The resulting gel adsorbate was developed with water at the rate of 50 ml. per minute while the eluate was monitored with a refractometer. The eluate was recovered in fractions, assayed, and the appropriate active fractions combined. The 630 ml. of eluate between 5,600 ml. and 6,230 ml. was found to contain 19.1 mg./ml. of total solids and had an activity of 68 units/ml. when assayed by the above-described *Proteus vulgaris* disc assay procedure. This represented Antibiotic 833A having a potency of 3.6 units/mg.

Four additional chromatograms were carried out in this same way using, respectively, 275 ml. and 287 ml. portions of the concentrate of Fraction 5 and two 285 ml. portions of the concentrate of Fraction 4. The rich fractions from all five of the chromatograms were pooled and concentrated under reduced pressure to about 100 mg./ml. The 660 ml. of the resulting concentrate had a potency of 4.1 units/mg.

100 ml. of this concentrate was passed through a column containing 2,480 ml. of strongly acidic cation exchange resin of the sulfonate type having a styrene-divinylbenzene matrix (sold by the Dow Chemical Company under the trade name Dowex 50 x 2) on the hydrogen form. The resulting resin adsorbate was developed with water at the rate of 19 ml. per minute and 20.5 ml. fractions of the resulting eluate collected, the eluate being monitored by a recording refractometer. Fractions 45–65 were titrated separately to pH with 0.1 N sodium hydroxide. Fractions 52–62 were then assayed and pooled to obtain an aqueous solution of Antibiotic 833A.

In the same way, five additional 100 ml. portions of the concentrate were chromatographed on the strongly acidic cation exchange resin and the most active fractions of the resulting resin eluates were combined with Fractions 52–62 to obtain a total of 1,870 ml. This aqueous solution of Antibiotic 833A had a pH of 6.8, a total solids content of 2.9 mg./ml., and assayed at 70 units/ml. Thus, the potency of the sodium salt of Antibiotic 833A in this aqueous solution was 24 units/mg. The aqueous solution was then concentrated under reduced pressure and freeze-dried to obtain 4.7 grams of product.

The fermentation broth used as the starting material in the above procedure was prepared as follows:

A lyophilized culture of *Streptomyces fradiae* MA-2898 (ATCC 21096) [NRRL B-3357] was used to inoculate 50 ml. of sterilized medium having the following composition:

| | Grams/liter |
|---|---|
| Yeast extract | 10 |
| Glucose | 10 |
| $MgSO_4 \cdot 7H_2O$ | 0.05 |
| Phosphate buffer,[1] 2 ml. | |
| Distilled water q.s., balance. | |

[1] 91 grams $KH_2PO_4$ and 95.0 grams $Na_2HPO_4$ made up to 1 liter with distilled water.

The inoculated flask was then placed on a 220 r.p.m. rotary shaker with 2″ throw and incubated for 48 hours at 28° C.

An inoculum of 10 ml. of the resulting vegetative growth was then used to inoculate a 2-liter baffled Erlenmeyer flask containing 500 ml. of sterilized medium of the same composition shown above. The inoculated flask was then placed on a 220 r.p.m. rotary shaker and incubated for 48 hours at 28° C.

The resulting fermentation broth was used to inoculate a 50-gallon stainless steel fermenter containing 160 liters of sterile medium of the same composition shown above. The inoculated medium was incubated at 28° C. with agitation while maintaining an airflow of 3 c.f.m. through the fermenting broth. During the fermentation period, small amounts of Polyglycol 2000 were added to control foaming of the batch.

An inoculum of 25 liters of the resulting fermentation broth was then used to inoculate a 200-gallon stainless steel fermenter containing 510 liters of sterile medium of the following composition:

| | Grams/liter |
|---|---|
| Rolled oats | 20 |
| Distillers solubles | 10 |
| Soybean meal | 20 |
| Sodium citrate | 2 |
| Sodium ascorbate | 0.5 |
| Distilled water q.s., balance. | |

The pH of this medium was adjusted to 6.5 before sterilization. The inoculated broth was then incubated at a temperature of 28° C. with agitation while maintaining an airflow of 10 c.f.m. for 3 days. During the fermentation, Polyglycol 2000, an antifoam agent, is added in small quantities to prevent excessive foaming of the fermentation broth. The fermentation broth was then filtered with the aid of diatomaceous earth. The filtered broth had a pH of 7.9 and contained 13.4 mg./ml. of total solids. Assay of the filtered broth by the *Proteus vulgaris* disc plate assay procedure showed the broth to contain 0.8 unit/ml. of Antibiotic 833A, corresponding to an activity of the broth solids of 0.06 unit/mg.

EXAMPLE 2

5.6 liters of filtered fermentation broth, having an inhibition zone of 26 mm. when assayed against *Proteus vulgaris* as the assay organism using 14 mm. discs, was adjusted to pH 7.0 and passed through a column containing 100 ml. of a strongly basic anion exchange resin composed of quaternary ammonium exchange groups attached to a styrene-divinylbenzene polymer lattice (Dowex 1 x 2) on the chloride cycle at the rate of 10 ml. per minute. The resulting spent broth had no antibiotic activity when assayed with *Proteus vulgaris* as described above.

The resulting resin adsorbate was washed with about 100 ml. of water and then eluted with a 3% solution of ammonium chloride in 90% methanol. The eluate was collected in 50 ml. fractions, which exhibited the following activities by the above-described standard *Proteus vulgaris* assay procedure:

(1) No activity
(2) 26 mm. zone
(3) 28 mm. zone at 1:25 dilution
(4) 26 mm. zone at 1:100 dilution
(5) 35 mm. zone
(6) 22 mm. zone
(7) 18 mm. zone
(8-10) No activities Fraction No. 4, which contained most of the antibiotic, was concentrated under vacuum to remove the methanol and then diluted with water to 50 ml. The aqueous solution of Antibiotic 833A so obtained had a pH of 5.6, a total solids of 37 mg./ml., and gave a 25.5 mm. zone at a dilution of 1:100 when assayed with *Proteus vulgaris* as described above.

The fermentation broth used as the starting material in the above procedure was prepared as follows:

(a)

To 10 ml. of sterile AO medium of the following composition:

| | Grams/liter |
|---|---|
| Beef extract | 3 |
| Casein hydrolysate | 10.6 |
| Dextrose | 10 |
| Sodium chloride | 5 |
| Distilled water q.s., balance. | | and having a pH of 7.2 before sterilization was added an agar slant culture of *Streptomyces fradiae* MA-2898 [NRRL B-3357] (ATCC 21096) on FA agar medium of the following composition:

| | Grams/liter |
|---|---|
| Agar | 20 |
| Yeast extract | 10 |
| Glucose | 10 |
| $MgSO_4 \cdot 7H_2O$ | 0.05 |
| Phosphate buffer,[1] 2 ml. | |
| Distilled water q.s., balance. | |

[1] 91 grams $KH_2PO_4$ and 95 grams $Na_2PO_4$ made up to 1 liter with distilled water.

A 250 ml. baffled Erlenmeyer flask containing 50 ml. of sterile AO medium was inoculated with 3 ml. of this cell suspension. The flasks were then shaken on a 220 r.p.m. rotary shaker with a 2″ throw at 28° C. for 72 hours. The resulting inoculum was then used to seed each of a series of 2-liter baffled Erlenmeyer flasks containing 350 ml. of sterile FD medium, 10.5 ml. of the vegetative growth being used for each flask. The inoculated flasks were then incubated on a 145 r.p.m. rotary shaker having a 2″ throw for 96 hours. The contents of 10 flasks were then combined.

The fermentation broth so obtained and having a pH of 6.6 was filtered with the aid of diatomaceous earth. The filtered broth was found to give a 26 mm. zone of activity when assayed with *Proteus vulgaris* as described above.

(b)

A lyophilized culture of Streptomyces MA-2898 [NRRL B-3357] (ATCC 21096) was used to inoculate 50 ml. of sterile FA medium consisting of the following ingredients:

| | Grams/liter |
|---|---|
| Yeast extract | 10 |
| Glucose | 10 |
| $MgSO_4 \cdot 7H_2O$ | 0.05 |
| Phosphate buffer,[1] 2 ml. | |
| Distilled water q.s., balance. | |

[1] 91 grams $KH_2PO_4$ and 95 grams $Na_2PO_4$ made up to 1 liter with distilled water.

The inoculated flask was then placed on a 220 r.p.m. rotary shaker with 2″ throw and incubated for 48 hours at 28° C. and the resulting fermentation broth used to inoculate a second stage seed tank containing 50 ml. of the same medium in a 250 ml. baffled Erlenmeyer flask using a 2% inoculum. The second stage seed flasks were also shaken on the rotary shaker at 28° C. for 2 days.

An inoculum of 10.5 ml. of this vegetative growth was then used to inoculate a 2-liter baffled Erlenmeyer flask containing 350 ml. of sterilized medium consisting of the following ingredients:

| | Grams/liter |
|---|---|
| Dry oatmeal | 20 |
| Tomato paste | 20 |
| Distilled water q.s., balance. | |

These 2-liter flasks were incubated on a 145 r.p.m. rotary shaker with a 2″ throw for 72 hours at 28° C. At the end of the incubation period, the contents of 10 such flasks were combined and filtered with the aid of diatomaceous earth to remove the mycelium. The resulting filtered fermentation broth gave an inhibition zone of 29 mm. when assayed versus *Proteus vulgaris* MB-838 by the procedure described above.

2.6 liters of the filtered fermentation broth from (a) and 3 liters of the filtered fermentation broth of (b) were combined and used as the starting material in the above procedure.

EXAMPLE 3

Fractions 3 and 5 of the resin eluate prepared as described in Example 2 were combined and concentrated under vacuum to 50 ml. having a pH of 5.4, a total solids of 72 mg./ml., and giving a 27 mm. zone at a 1:40 dilution with water when tested in accordance with the *Proteus vulgaris* assay.

5 ml. of this aqueous solution of Antibiotic 833A was chromatographed on 35 grams of 100-200 mesh spherical polyacrylamide gel having an operating range of 200-2000 (Bio-Gel P-2). The gel adsorbate was then developed with distilled water at the rate of 25 ml. per hour and 4.6 ml. eluate fractions collected. Fraction Nos. 17-21 showed Antibiotic 833A activity when assayed by the *Proteus vulgaris* disc assay method and showed a purity of about 3 to 5 times the purity of the starting material.

During the elution with the distilled water, the column was monitored with a differential recording refractometer and salt was found in Fractions 21-24 having a $K_{av}$ of 1.88. The $K_{av}$ of the antibiotic active fractions was found to be 1.56.

EXAMPLE 4

500 ml. of a vegetative culture of *Streptomyces fradiae* MA-2898 (ATCC 21096) [NRRL B-3357] prepared by growing the microorganism in a 2-liter baffled Erlenmeyer flask following the procedure described in Example 1 was used to inoculate a 200-gallon stainless steel fermenter containing 467 liters of sterile medium of the following composition:

| | Grams/liter |
|---|---|
| Yeast extract | 10 |
| Glucose | 10 |
| $MgSO_4 \cdot 7H_2O$ | 0.05 |
| Phosphate buffer,[1] 2 ml. | |
| Distilled water q.s., balance. | |

[1] 91 grams $KH_2PO_4$ and 95.0 grams $Na_2HPO_4$ made up to 1 liter with distilled water.

The inoculated medium was incubated at 28° C. for 24 hours with mechanical agitation while maintaining an airflow of 10 c.f.m. through the fermenting medium; a small quantity of Polyglycol 2000 being added to control foaming. 215 liters of the resulting fermentation broth was used to inoculate a 1500-gallon stainless steel fermenter containing 1200 gallons of sterile nutrient medium having the following composition:

| | Grams/liter |
|---|---|
| Rolled oats | 20 |
| Distillers solubles | 10 |
| Soybean meal | 20 |
| Sodium citrate | 2 |
| Sodium ascorbate | 0.5 |
| Distilled water q.s., balance. | | the medium being adjusted to pH 6.5 prior to sterilization.

The inoculated broth was incubated at a temperature of 28° C. with agitation while maintaining an airflow of 55 c.f.m. for 2 days, Polyglycol 2000 being added in small amounts to control the foaming.

The resulting fermentation broth was filtered with the aid of diatomaceous earth. 550 gallons of the filtered broth having an activity of 0.34 unit/ml. was passed through a column of previously-used anion exchange resin of the quaternary ammonium type on a styrene-divinyl-benzene matrix (Dowex 1 x 2) on the chloride cycle. The resulting resin adsorbate was eluted with a 3% aqueous solution of sodium chloride and the resulting eluate collected in 5-gallon fractions. The spent broth, after passing through the column, was inactive as determined by assay with *Proteus vulgaris*. Fractions 5–12, which contained most of the antibiotic activity, were combined.

EXAMPLE 5

A lyophilized culture of *Streptomyces fradiae* MA-2913 (ATCC 21099) [NRRL B-3360] was used to inoculate 50 ml. of sterile medium of the following composition in a 250 ml. baffled Erlenmeyer flask:

| | Grams/liter |
|---|---|
| Ground oatmeal | 10 |
| Yeast hydrolysate | 10 |
| $MgSO_4 \cdot 7H_2O$ | 0.05 |
| Phosphate buffer,[1] 2 ml. | |
| Distilled water q.s., balance. | |

[1] 91 grams $KH_2PO_4$ and 95.0 grams $Na_2HPO_4$ made up to 1 liter with distilled water.

The inoculated flask was then incubated for 24 hours at 28° C. on a rotary shaker. 10 ml. of the resulting fermentation broth was used to inoculate a second 250 ml. baffled Erlenmeyer flask containing 50 ml. of the same sterile medium. The resulting inoculated broth was incubated at 28° C. on a rotary shaker for 24 hours. The resulting fermentation broth was used to inoculate a 5-liter fermenter containing 2600 ml. of sterile nutrient medium of the following composition:

| | Grams/liter |
|---|---|
| Steel cut oats | 30 |
| Corn steep liquor | 10 |
| Soybean meal | 10 |
| Water q.s., balance. | |

The pH was adjusted to 6.6 before sterilization.

The inoculated nutrient broth was then incubated at 28° C. for 4 days while agitating and aerating the fermentation broth with 3 liters of air per minute.

The resulting fermentation broth was then filtered to obtain 2350 ml. of broth having a pH of 9.0 and an activity of 3.8 units/ml. as determined by the *Proteus vulgaris* disc assay procedure. 750 ml. of the fermentation broth were passed throught a column containing 50 ml. of a strongly basic anion exchange resin of the quaternary ammonium type (Dowex 1 x 2) on the chloride cycle. The spent broth from the column contained only a small amount of Antibiotic 833A. The resulting resin adsorbate was eluted with a 1% solution of sodium chloride in water and 50 ml. fractions of the resulting eluate collected. The first six eluates contained the following amounts of antibiotic activity:

(1) 5%   (4) 10%
(2) 35%  (5) 6%
(3) 28%  (6) 2%

EXAMPLE 6

A column of strongly basic anion exchange resin composed of quaternary ammonium exchange groups attached to a styrene-divinylbenzene polymer lattice (Dowex 1 x 2) on the chloride cycle (50–100 mesh) 84.5 cm. x 1.4 cm. was prepared. The resin was washed with 725 ml. of 0.1 M sodium chloride to equilibrate the resin. 36 mg. of crude sodium salt of Antibiotic 833A assaying 27 μ/mg. prepared by the process described in Example 1 was dissolved in 1 ml. of 0.1 M sodium chloride at a rate of 1 ml./minute collecting five ml. fractions. The effluent stream was monitored using a Mecco-Matic Model 2 refractometer. Every fifth fraction was assayed against *Proteus vulgaris* MB–838 to locate the general area of bioactivity. Two bioactive peaks were observed: fractions 180 and 268 called Fraction A–1 and 420 to 560 called Fraction A–2. The fractions in each peak were combined and concentrated to 10 ml.

Each concentrate was percolated over a polyacrylamide gel (Bio-Gel P–2) (150 cm. x 1.5 cm.) to separate the antibiotic from the sodium chloride. The effluent was monitored with Mecco-Matic Model 2 refractometer. Fractions were assayed against *Proteus vulgaris* MB–838 to locate bioactivity. Bioactivity between 114 ml. and 250 ml. was pooled, concentrated, and freeze-dried. The A–1 fraction consisting of 1.4 mg. assayed 277 μ/mg. The A–2 fraction consisting of 3.5 mg. assayed 170 μ/mg.

EXAMPLE 7

A column of strongly basic anion exchange resin composed of quaternary ammonium exchange groups attached to a styrene-divinylbenzene polymer lattice (Dowex 1 x 2) on the chloride cycle (200–400 mesh) resin 84.5 cm. x 1.4 cm. was prepared. The resin was washed with 800 ml. of tris-(hydroxymethyl)-aminomethane/HCl pH 8.0 (0.1 MCl⁻) buffer to equilibrate the resin. Three hundred five and one-half mg. of crude sodium salt of Antibiotic 833A assaying 19 μ/mg. was dissolved in 3 ml. of the same buffer and applied to the top of the resin bed. The column was developed with the same buffer at a rate of 1 ml./minute collecting five ml. fractions. The effluent stream was monitored using a Mecco-Matic Model 2 refractometer. Every fifth fraction was assayed against *Proteus vulgaris* MB–838 to locate the general area of bioactivity. One bioactive peak was observed: Fractions 115 to 185. Fractions 164 to 184 were pooled and concentrated to dryness. The residue was dissolved in water (final volume 12.0 ml.) and percolated over a polyacrylamide gel (Bio-Gel P–2) (143 cm. x 4.7 cm.) to separate the antibiotic from the buffer. The effluent was monitored with a Mecco-Matic Model 2 refractometer. Fractions were assayed against *Proteus vulgaris* MB–838 to locate bioactivity. Bioactivity in the fraction between 1420 ml. and 1680 ml. was pooled, concentrated, and freeze-dried. The resulting residue consisting of 89.6 mg. assayed 46 μ/mg.

This impure Antibiotic 833A was dissolved in 5 ml. of water and the solution passed through a column containing 2 ml. of strongly acidic cation exchange resin composed of nuclear sulfonic acid exchange groups attached to a styrene-divinylbenzene polymer lattice (Dowex 50) on the sodium cycle to replace the tris-(hydroxymethyl)-aminomethyl-aminomethane group with sodium. The sodium salt of Antibiotic 833A in the 10 ml. of effluent assayed 480 units/ml. The solution was freeze-dried to afford 71.6 mg. of solid assaying 67 units/mg.

EXAMPLE 8

1500 ml. of filtered fermentation broth, Batch Nos. 15733 and 15734, assaying at 0.1 units/ml. and having an inhibition zone of 21.5 mm. when assayed against *Proteus vulgaris* MB-838 using 14 mm. discs, and having a pH of 6.1 was pumped over 100 ml. of weakly basic crosslinked acrylic ion exchange resin (IRA-68) on the free base cycle at 7 ml./minute. The spent broth had no antibiotic activity when assayed against *Proteus vulgaris*. The column was washed with water and eluted with 1% aqueous sodium chloride. 10 ml. fractions were collected, after collecting a 30 ml. forerun which was discarded. The fractions were assayed and fractions 11-30 were found to contain 93% of the activity charged to the column. The active fractions, 11-30, were combined, giving 192 ml. of solution having a pH of 9.5. The pH was adjusted to 7 and the solution was assayed against *Proteus vulgaris* MB-838. The results of the assay are as follows:

| Dilution: | Inhibition zone, mm. |
|---|---|
| (1) undiluted | 32.5 |
| (2) 1:2 | 29 |
| (3) 1:4 | 24.5 |
| (4) 1:8 | 20.5 |

The fermentation broth used in the above example was prepared according to the procedure for preparing the broth followed in Example 1.

It should be understood that although this invention has been described with reference to particular embodiments thereof, changes and modifications may be made which are within its intended scope, and it should be limited only by the language of the appended claims.

What is claimed is:

1. The process for recovering the antibiotic (—) (cis-1,2-epoxypropyl)phosphonic acid in purified form from fermentation broth produced by aerobically fermenting strains of *S. fradiae* in aqueous mediums containing sources of carbon and nitrogen assimilable by the microorganism and inorganic salts, which comprises adjusting the pH of the broth to about 7 with aqueous base, passing the broth through a strongly basic anion exchange resin, eluting the resulting resin adsorbate with a 3% solution of ammonium chloride in 90% methanol, concentrating selected fractions of the eluate to remove the methanol, passing the resulting aqueous solution through a polyacrylamide gel of 50–200 mesh, developing the gel with water and recovering purified antibiotic from selected eluate fractions.

2. The process for recovering the antibiotic (—) (cis-1,2-epoxypropyl)phosphonic acid in purified form from fermentation broth produced by aerobically fermenting strains of *S. fradiae* in aqueous mediums containing sources of carbon and nitrogen assimilable by the microorganism and inorganic salts, which comprises adjusting the pH of the broth to about 7 with aqueous base, passing the broth through a strongly basic anion exchange resin, eluting the resulting resin adsorbate with a 3% solution of ammonium chloride in 90% methanol, concentrating selected fractions of the eluate to remove the methanol, passing the resulting aqueous solution through a polyacrylamide gel of 50–200 mesh, concentrating selected eluate fractions containing the antibiotic, passing the resulting concentrates through a strongly acidic cation exchange resin on the hydrogen cycle, eluting the resulting adsorbate with water, neutralizing selected fractions of the eluate to about pH 7 with a base and evaporating the neutralized solution to obtain a purified form of the antibiotic.

References Cited

UNITED STATES PATENTS

| 3,221,008 | 11/1965 | Wolf et al. | 424—124 X |
| 3,329,566 | 7/1967 | Pines | 424—124 |

NORMA S. MILESTONE, Primary Examiner

U.S. Cl. X.R.

195—80; 424—203